US009385949B2

(12) United States Patent
Vershkov et al.

(10) Patent No.: US 9,385,949 B2
(45) Date of Patent: Jul. 5, 2016

(54) ROUTING CONTROLLED BY SUBNET MANAGERS

(71) Applicant: MELLANOX TECHNOLOGIES LTD., Yokneam (IL)

(72) Inventors: Ilya Vershkov, Rishon Lezion (IL); Dror Goldenberg, Zichron Yaakov (IL); Eitan Zahavi, Zichron Yaakov (IL); Diego Crupnicoff, Buenos Aires (AR); Marina Lipshteyn, Netanya (IL)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 518 days.

(21) Appl. No.: 13/721,052

(22) Filed: Dec. 20, 2012

(65) Prior Publication Data

US 2014/0177639 A1 Jun. 26, 2014

(51) Int. Cl.
*H04L 12/28* (2006.01)
*H04L 12/775* (2013.01)
*H04J 1/16* (2006.01)
*H04L 12/761* (2013.01)

(52) U.S. Cl.
CPC .............. *H04L 45/58* (2013.01); *H04L 45/16* (2013.01)

(58) Field of Classification Search
USPC .......................................... 370/282, 389, 386
See application file for complete search history.

(56) References Cited

U.S. PATENT DOCUMENTS

| | | | |
|---|---|---|---|
| 5,999,536 A | 12/1999 | Kawafuji et al. | |
| 6,169,741 B1 | 1/2001 | LeMaire et al. | |
| 6,831,918 B1 | 12/2004 | Kavak | |
| 7,009,968 B2 | 3/2006 | Ambe et al. | |
| 7,136,642 B1* | 11/2006 | Massie | H04W 24/00 455/428 |
| 7,499,456 B2 | 3/2009 | De Silva et al. | |
| 7,650,424 B2 | 1/2010 | Armitage | |
| 7,715,328 B2 | 5/2010 | Ambe et al. | |
| 8,175,094 B2 | 5/2012 | Bauchot et al. | |
| 8,243,745 B2 | 8/2012 | Endo et al. | |
| 2002/0039357 A1 | 4/2002 | Lipasti et al. | |
| 2004/0213220 A1* | 10/2004 | Davis | 370/389 |
| 2005/0144313 A1* | 6/2005 | Arndt et al. | 709/238 |
| 2005/0266842 A1* | 12/2005 | Nasielski et al. | 455/432.1 |
| 2008/0253299 A1 | 10/2008 | Damm et al. | |
| 2009/0034540 A1* | 2/2009 | Law | 370/400 |
| 2011/0261687 A1* | 10/2011 | Armstrong et al. | 370/230 |
| 2012/0051362 A1 | 3/2012 | Rabie et al. | |
| 2012/0063466 A1 | 3/2012 | Sultan et al. | |

(Continued)

OTHER PUBLICATIONS

Almog et al., U.S. Appl. No. 13/717,733, filed Dec. 18, 2012.

(Continued)

*Primary Examiner* — John Pezzlo
(74) *Attorney, Agent, or Firm* — D. Kligler IP Services Ltd.

(57) ABSTRACT

A method for communication in a packet data network that includes at least first and second subnets interconnected by multiple routers and having respective first and second subnet managers. The method includes assigning respective local identifiers to ports for addressing of data link traffic within each subnet, such that the first subnet manager assigns the local identifiers in the first subnet, and the second subnet manager assigns the local identifiers in the second subnet. The routers are configured by transmitting and receiving control traffic between the subnet managers and the routers. Data packets are transmitted between network nodes in the first and second subnets via one or more of the configured routers under control of the subnet managers.

22 Claims, 2 Drawing Sheets

(56) References Cited

U.S. PATENT DOCUMENTS

| | | | |
|---|---|---|---|
| 2012/0093023 A1* | 4/2012 | Ficet et al. | 370/252 |
| 2012/0275301 A1 | 11/2012 | Xiong | |
| 2013/0182704 A1 | 7/2013 | Jacobs et al. | |
| 2013/0301646 A1* | 11/2013 | Bogdanski et al. | 370/401 |

OTHER PUBLICATIONS

Ayoub et al., U.S. Appl. No. 13/731,030, filed Dec. 30, 2012.

Nichols et al., "Definition of the differentiated Services Field (DS Field) in the IPv4 and IPv6 Headers", Network Working Group, Internet Engineering Task Force, RFC2474, 19 pages, Dec. 1998.

IEEE 802.1Q, "Media Access Control (MAC) Bridges and Virtual Bridged Local Area Networks", IEEE Standard for Local and metropolitan area networks, chapter 6 (p. 47-96) and chapter 9.6 (pp. 150-151), Aug. 31, 2011.

IEEE 802.1Qbb, "Media Access Control (MAC) Bridges and Virtual Bridged Local Area Networks—Amendment 17: Priority-based Flow Control", IEEE Standard for Local and metropolitan area networks, 40 pages, Sep. 30, 2011.

Cisco Systems, "Priority Flow Control: Build Reliable Layer 2 Infrastructure", 8 pages, Jun. 2009.

Infiniband Trade Association, "Architecture Specification", vol. 1, Release 1.2.1., Nov. 2007.

Annex 31B of IEEE802.3x, "MAC Control Pause operation", pp. 741-751, year 2008.

Almog et al., U.S. Appl. No. 13/754,912, filed Jan. 31, 2013.

U.S. Appl. No. 13/717,733 Office Action dated Jun. 12, 2014.

U.S. Appl. No. 13/754,912 Office Action dated Oct. 23, 2014.

U.S. Appl. No. 13/754,912 Office Action dated Apr. 22, 2015.

\* cited by examiner

ROUTING CONTROLLED BY SUBNET MANAGERS

FIELD OF THE INVENTION

The present invention relates generally to computer networks, and particularly to routing data packets between subnets.

BACKGROUND

A subnetwork, commonly referred to as a subnet, is a logical subdivision of a Layer-3 network. Network ports of nodes within a given subnet share the same Layer-3 network address prefix. For example, in Internet Protocol (IP) networks, the ports in each subnet share the same most-significant bit-group in their IP address, so that the IP address is logically divided into two fields: a network or routing prefix, and the rest field or host identifier. Similarly, in InfiniBand™ (IB) networks, each subnet is uniquely identified with a subnet identifier known as the Subnet Prefix. For each port in the subnet, this prefix is combined with a respective Globally-Unique Identifier (GUID) to give the IB Layer-3 address of the port, known as the Global Identifier (GID).

Typically, the logical subdivision of a Layer-3 network into subnets reflects the underlying physical division of the network into Layer-2 local area networks. The subnets are connected to one another by routers, which forward packets on the basis of their Layer-3 (IP or GID) destination addresses, while within a given subnet packets are forwarded among ports by Layer-2 switches or bridges. These Layer-2 devices operate in accordance with the applicable Layer-2 protocol and forward packets within the subnet according to the Layer-2 destination address, such as the Ethernet™ medium access control (MAC) address or the IB link-layer Local Identifier (LID). In general, Layer-2 addresses in a given subnet are recognized only within that subnet, and routers will swap the Layer-2 address information of packets that they forward from one subnet to another.

In IB networks, a Subnet Manager (SM) in each subnet assigns an LID to each physical port of each host within the given subnet. A subnet administration (SA) function provides nodes with information gathered by the SM, including communication of the LID information to a Subnet Management Agent (SMA) in each node of the subnet. For simplicity and clarity in the description that follows, all of these subnet management and administration functions will be assumed to be carried out by the SM. Layer-2 switches within the subnet are configured by the SM to forward packets among the ports on the basis of the destination LID (D-LID) in the packet header. The SM is typically implemented as a software process running on a suitable computing platform in one of the nodes in the subnet, such as a host computer, switch or appliance.

Routing protocols are used to distribute routing information among routers, so as to enable each router to determine the port through which it should forward a packet having any given Layer-3 destination address. In IP networks, the routing information is developed and distributed by and among the routers themselves. A number of routing protocols are commonly used to exchange routing information among IP routers, such as Open Shortest Path First (OSPF) and the Border Gateway Protocol (BGP).

SUMMARY

Embodiments of the present invention provide improved methods and devices for routing packets between subnets.

There is therefore provided, in accordance with an embodiment of the present invention, a method for communication in a packet data network including at least first and second subnets interconnected by multiple routers and having respective first and second subnet managers. The method includes assigning respective local identifiers to ports for addressing of data link traffic within each subnet, such that the first subnet manager assigns the local identifiers in the first subnet, and the second subnet manager assigns the local identifiers in the second subnet. The routers are configured by transmitting and receiving control traffic between the subnet managers and the routers. Data packets are transmitted between network nodes in the first and second subnets via one or more of the configured routers under control of the subnet managers.

In some embodiments, transmitting the data packets includes receiving at the first subnet manager a routing query from a sending node in the first subnet with respect to transmission of a packet to a destination node in the second subnet, and in response to the routing query, sending an instruction from the first subnet manager to the sending node to direct the packet to a specified router. Sending the instruction may include selecting the specified router so as to balance a traffic load among the multiple routers. Additionally or alternatively, sending the instruction includes instructing the sending node to direct the packet to a first router and upon occurrence of a failure of the first router, to direct the packet to a second router. Further additionally or alternatively, when the routing query includes an address field of the destination node, sending the instruction may include selecting the specified router as a numerical function of the address field.

In a disclosed embodiment, the routing query specifies a global identifier of the destination node, and sending the instruction includes instructing the sending node to address the packet to a local identifier that the subnet manager has assigned to a port of the specified router. The method may include transmitting, from the sending node to a distributed name server, a name query with respect to a host name of the destination node, and receiving the global identifier at the sending node from the distributed name server in response to the name query.

In some embodiments, transmitting the data traffic includes receiving at the second subnet manager a routing query from a router in response to having received at the router a packet from a sending node in the first subnet for transmission to a destination node in the second subnet, and in response to the routing query, sending an instruction from the second subnet manager to the router to direct the packet to a port having a specified local identifier in the second subnet.

Additionally or alternatively, transmitting the data packets includes receiving at the first subnet manager a routing query from a node in the network, sending an instruction, in response to the routing query, from the first subnet manager to the node to direct the packet to a specified port, and caching the instruction at the node for use in forwarding of subsequent packets.

In a disclosed embodiment, configuring the routers includes forming a multicast group extending over at least the first and second subnets via one or more of the routers.

There is also provided, in accordance with an embodiment of the present invention, apparatus for communication, including a plurality of routers interconnecting at least first and second subnets in a packet data network. At least first and second subnet managers are operative to assign respective local identifiers to ports for addressing of data link traffic within each subnet, such that the first subnet manager assigns the local identifiers in the first subnet, and the second subnet manager assigns the local identifiers in the second subnet. The subnet managers configure the routers by transmitting and receiving control traffic to and from the routers, and control transmission of data packets between network nodes in the first and second subnets via one or more of the configured routers.

There is additionally provided, in accordance with an embodiment of the present invention, a computer software product, including a non-transitory computer-readable medium in which program instructions are stored, which instructions, when read by a computer in a first subnet of a packet data network that includes a plurality of routers interconnecting multiple subnets, cause the computer to function as a first subnet manager in the first subnet so as to assign respective local identifiers to ports for addressing of data link traffic within the first subnet, while at least a second subnet manager assigns the local identifiers to the ports in at least a second subnet. The instructions cause at least the first and second subnet managers to configure the routers by transmitting and receiving control traffic to and from the routers, and to control transmission of data packets between network nodes in the first and second subnets via one or more of the configured routers.

The present invention will be more fully understood from the following detailed description of the embodiments thereof, taken together with the drawings in which:

DETAILED DESCRIPTION OF EMBODIMENTS

Figure 1:
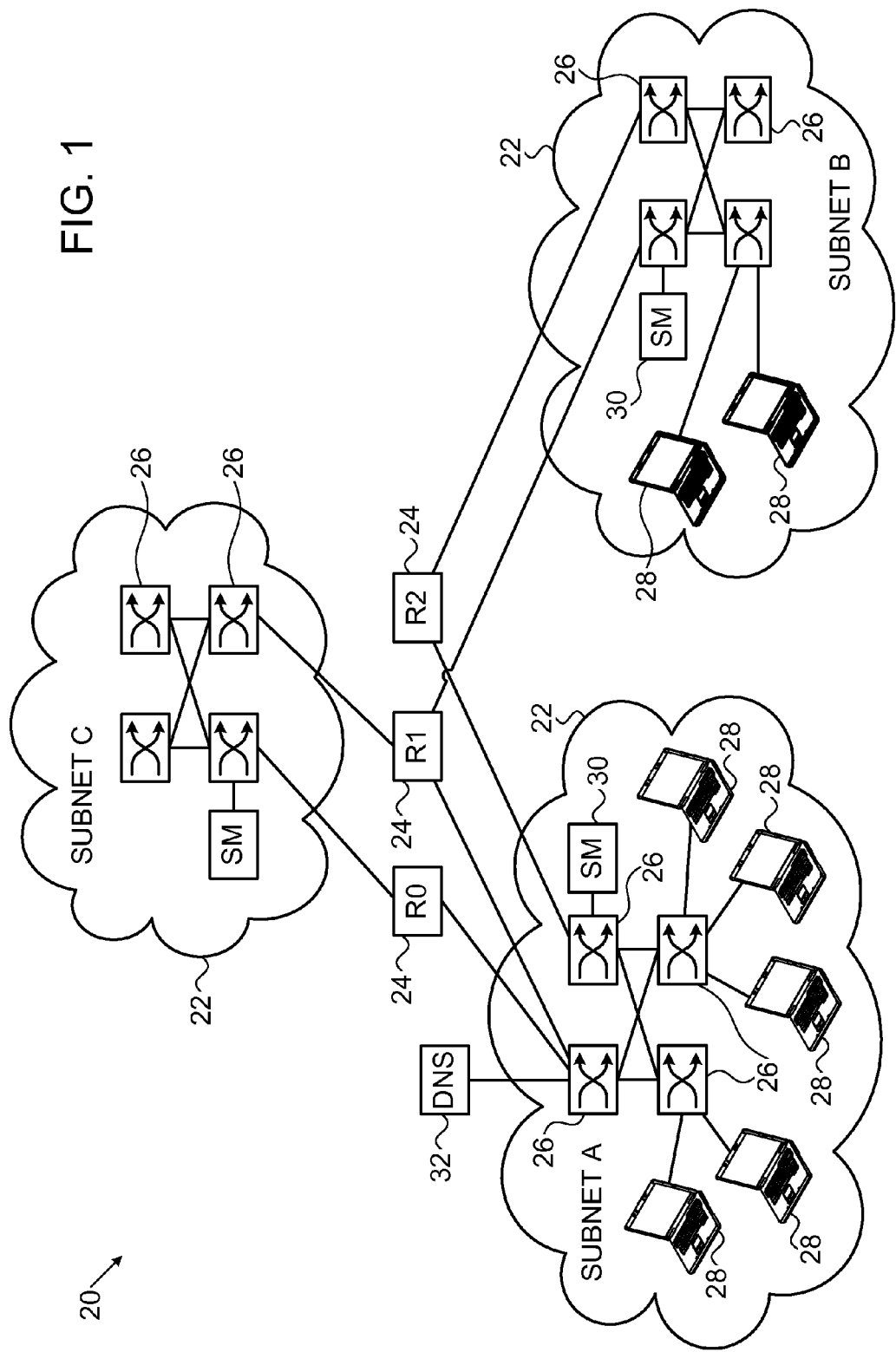
FIG. 1 is a block diagram that schematically illustrates a computer network, in accordance with an embodiment of the present invention.

In order to support the routing protocols that have become standard in IP networks, IP routers must typically have substantial autonomous computing power, memory and communication capabilities. These sorts of routing protocols and capabilities have not been developed in Layer-3 routers for other network architectures, such as InfiniBand (IB) networks.

Embodiments of the present invention that are described hereinbelow provide methods and apparatus for routing packets between subnets that take advantage of management capabilities that already exist within the subnets and thus relieve routers of the need to support complex routing protocols. Such an approach is appropriate particularly for IB networks, in which the capabilities and responsibilities of the existing subnet manager can be expanded to manage inter-subnet routing, as well. The embodiments described below therefore relate particularly to IB networks and use the vocabulary of IB specifications. The principles of the present invention, however, may also be applied, mutatis mutandis, in other network architectures that have a similar subnet management function.

In the disclosed embodiments, a packet data network comprises at least two subnets, which have respective subnet managers and are interconnected by multiple routers. The subnet managers assign local identifiers to the ports in their respective subnets for addressing of data-link (Layer 2) traffic within the subnet. The subnet managers transmit and receive control traffic, typically in the form of management packets, in order to learn the network topology and configure the routers accordingly. Data packets can then be transmitted between network nodes in the first and second subnets via the routers so configured under control of the subnet managers.

According to this scheme, before a sending node in a first subnet transmits a data packet to a destination node in another subnet, the sending node submits a routing query to the subnet manager in the first subnet. (In the InfiniBand context, this sort of query may be referred to as a "path query.") In response to the query, the subnet manager sends an instruction to the sending node to direct the data packet to a specified router that connects the subnets. In providing these instructions, the subnet manager may take into account considerations such as load balancing among two or more routers, as well as other facets of route optimization and protection in case of router failure. Upon receiving the data packet from the sending node, the router may then query the subnet manager in the destination subnet for forwarding instructions to the destination node, or multiple destination nodes in the case of a multicast packet. Alternatively, the subnet manager in the first subnet may provide the router with complete path information in response to the initial routing query, so that no further query by the router will be required.

The above approach is advantageous, as noted earlier, in leveraging capabilities that already exist within the subnets. It can provide optimized performance and quality of service while avoiding any need for a central routing authority or global synchronization of routing information, and while having no single point of failure. As routing intelligence is focused in the subnet managers, the routers themselves need be little more than switches with forwarding information provided by the subnet managers. Exchange of routing information between routers themselves is unnecessary.

FIG. 1 is a block diagram that schematically illustrates a computer network 20, in accordance with an embodiment of the present invention. It will be assumed, for clarity and convenience of description, that network operates in accordance with IB specifications, although as noted earlier, the principles of the present embodiment may similarly be applied in other Layer-3 networks that have a subnet management function similar to that defined in IB networks. Relevant features of the IB architecture are described in the *InfiniBand™ Architecture Specification Volume* 1 (Release 1.2.1, November 2007), distributed by the InfiniBand Trade Association and incorporated herein by reference, and particularly in Chapter 14: "Subnet Management" and Chapter 19: "Routers."

Network 20 comprises multiple subnets 22 (labeled subnets A, B and C), which are interconnected by Layer-3 routers 24 (labeled R0, R1 and R2). Each subnet 22 comprises multiple Layer-2 switches 26, which connect to hosts 28 via suitable host channel adapters (not shown). Switches 26 within each subnet may be interconnected in any suitable topology, such as a "fat tree" topology. Certain of the switches (for example, spine switches in the case of a fat tree topology) connect to routers 24 and thus enable packet transfer between subnets. In the pictured implementation, any given pair of subnets 22 is separated by no more than a single routing hop, but the principles of the present invention may also be extended to networks in which traffic between certain subnets must traverse two or more routers in sequence. Typically (although not necessarily), each pair of subnets 22 is connected by two or more routers 24, for purposes of load balancing and failure protection.

A subnet manager (SM) 30 in each subnet 22 performs management and administration functions defined by the above-mentioned IB specification, as well as additional routing functions that are described herein. (Optionally, more than one subnet manager may exist in a given subnet to provide backup in case of failure, but typically only a single subnet manager is active in performing these functions at any given time.) SM 30 is typically a combined hardware/software element, comprising a computing platform, such as an embedded or stand-alone central processing unit (CPU) with a memory and suitable interfaces, which runs management software that performs the functions described herein. The computing platform may be dedicated to subnet management functions, or it may alternatively be shared with other computing and communication functions. The software components of the SM may be downloaded to the computing platform in electronic form, for example over network 20 or via a separate control network (not shown). Alternatively or additionally, these software components may be stored on tangible, non-transitory computer-readable media, such as in optical, magnetic, or electronic memory.

SM 30 in each subnet 22 assigns a Layer-2 address, in the form of a LID, possibly including a multicast LID (MLID), to each port of each switch 26 and host 28 within the subnet. Each port also receives a GID Layer-3 address, wherein all ports in a given subnet have the same GID prefix, as explained above. Subnet managers 30 learn the topology of their respective subnets using methods defined by the IB specification, such as transmission and reception of suitable management packets, for example Direct Route Management Datagrams. By transmitting and receiving such packets to and from routers 24, the subnet managers are also able to learn which other subnets are connected to each router, as well as collecting information other network features, such as multicast groups. Alternatively or additionally, routers may autonomously publish their respective subnet connections to the subnet managers. By such mechanisms, SM 30 in subnet A may discover, for example, that this subnet is connected by both router R1 and router R2 to subnet B. The subnet managers save this intra- and inter-subnet topology information in their respective memories for use in making subsequent routing decisions, and update the information periodically when changes occur (due to failures or reconfiguration, for example).

In many network applications, processes and nodes are identified by names and/or numbers other than the LID and GID, such as a domain name, IP address or MAC address. Therefore, when a process running on one of hosts 28 needs to communicate with another node, possibly in a different subnet, the process may have only the name and not the GID needed to transmit a packet. To find the appropriate GID, the host may query a distributed name server (DNS) 32 at a predefined address in network 20. In response to a name query from one of hosts 28, DNS 32 returns the appropriate GID, which the host may then use as described below. DNS 32 may be implemented by any suitable means that are known in the art, such as manual tables, standard DNS servers, or SM-based translations.

Figure 2:
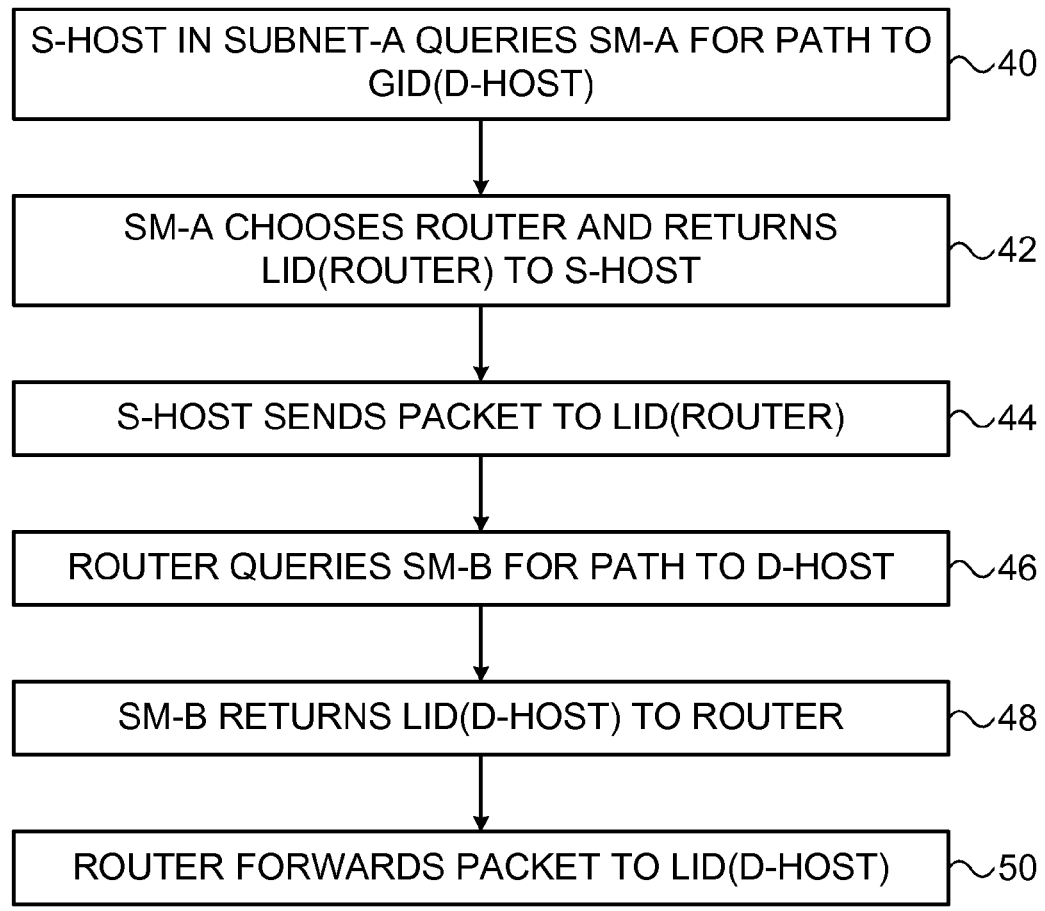
FIG. 2 is a flow chart that schematically illustrates a method for packet routing, in accordance with an embodiment of the present invention.

FIG. 2 is a flow chart that schematically illustrates a method for packet routing in network 20, in accordance with an embodiment of the present invention. It is assumed in the description that follows, for the sake of simplicity, that the packet in question is a unicast packet, but similar methods may be applied, mutatis mutandis, in routing multicast packets.

The method of FIG. 2 is initiated when one of hosts in subnet A (referred to as the sending host, or S-HOST) has to send a packet to a destination host (D-HOST) in another subnet, for example subnet B. The sending host may obtain the GID of the destination host from DNS 32, as described above, or by any other suitable means. To identify the LID in subnet A to which this packet should initially be sent, the sending host queries subnet manager 30 in subnet A (referred to as SM-A) for a path to the GID of the destination host, at a host query step 40.

In response to this query, SM-A checks its topology records to identify the router or routers 24 that can provide access to the destination GID. (Alternatively, if SM-A determines that the destination GID refers to a node in subnet A, then it may simply return the LID of that node to the sending host.) SM-A chooses an appropriate one of these routers 24, such as R1, and returns a response to the sending host containing the LID of the port of R1 on subnet A, at a host response step 42. When multiple routers are available for this purpose, the subnet manager may apply various considerations in choosing the response to return at step 42. For example, the subnet manager may choose different routers for different packets (based on the source and/or destination address, for instance) in order to balance the traffic load among the routers and thus optimize bandwidth availability. Additionally or alternatively, the subnet manager may give the sending host both primary and backup router LIDs, and instruct the sending host to direct the packet to the primary router first, or to the backup router in the event of a failure of the primary router.

For purposes of router selection at step 42, it may be useful for SM-A simply to take a numerical function of a destination address field specified in the query of step 40. For example, the subnet manager may choose the router by taking the modulus of the destination GID (DGID) by the number of routers available. In this case, each router will have a routing table whose size is on the order of 1/N (wherein N is the number of routers). This algorithm is useful in load balancing and scales readily with the numbers of hosts and routers that are supported.

After receiving instructions from the subnet manager, the sending host transmits a data packet containing the GID of the destination host in the destination GID (DGID) header field and the LID of the router port specified by the subnet manager in the destination LID (DLID) header field, at a packet transmission step 44. The sending host inserts its own GID and LID in the appropriate source address fields of the packet. Upon receiving this packet, the router (R1 in this example) identifies the destination GID as belonging to subnet B and therefore sends a routing query to subnet manager 30 in subnet B (SM-B) with respect to this GID, at a router query step 46. SM-B checks its own memory for the LID of the destination host corresponding to the specified GID, and returns this LID to router R1, at a router response step 48. Based on this information, the router replaces the destination LID of the packet that it received from the source host with the LID provided by SM-B, and replaces the source LID with the router's own port LID on subnet B, and thus transmits the packet to the destination host, at a packet forwarding step 50.

The above flow may not necessarily be repeated every time a packet is to be transmitted to a given DGID; rather, the sending host and the router may cache the responses that they receive at steps 42 and 48, and then used this cached information in forwarding subsequent packets to the same DGID without querying the subnet managers each time. The query responses and cached information may include not only GID/LID correspondence, but also other forwarding information, such as service levels. Furthermore, as noted earlier, SM-A may provide the necessary forwarding information not only to the sending host, but also to the router, in which case steps 46 and 48 may be unnecessary.

As noted earlier, although the examples presented above relate mainly to routing of unicast packets, the principles of the present invention and the capabilities of the subnet managers that are described above may similarly be applied to multicast routing. In this case, subnet managers 30 may form multicast groups extending over multiple subnets via routers 24. In contrast to IP routers that are known in the art, the subnet managers are capable of supporting dynamic groups, which may have multipath and/or asymmetrical packet distribution routes.

To set up multi-subnet multicast groups, subnet managers 30 may send and receive queries via routers 24 to discover multicast groups that are supported in neighboring subnets. A subnet manager may instruct a router to register a multicast group in which the router servers as the transit point between members in different subnets. Routers 24 are programmed to support only loop-free topologies in this regard. The topologies may be tree- or mesh-type and either uni- or bi-directional, and they may be shared among multiple multicast groups and subnets, or they may be specific to a given group and/or subnet.

Furthermore, the mechanisms by which subnet managers discover and distribute routing information may be used not only for exploring network connectivity, as described above (including multicast groups), but also for collecting other information regarding subnets 22 and the nodes that they contain, such as network maximum transfer units (MTU) and partition keys (PKEY), for example.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
in a packet data network comprising at least first and second subnets interconnected by multiple routers and having respective first and second subnet managers, assigning respective local identifiers to ports for addressing of data link traffic within each subnet, such that the first subnet manager assigns the local identifiers in the first subnet, and the second subnet manager assigns the local identifiers in the second subnet;
receiving by the first subnet manager, from a sending node in the first subnet, a routing query for a specific data packet directed to a destination node in the second subnet;
sending by the first subnet manager to the sending node, a routing instruction as to a specific router to which the specific data packet is to be transmitted, responsive to the routing query; and
providing the specific router, by one of the at least first and second subnet managers, a forwarding instruction for the specific data packet.

2. The method according to claim 1, wherein sending the routing instruction comprises selecting the specific router so as to balance a traffic load among the multiple routers.

3. The method according to claim 1, wherein sending the routing instruction comprises instructing the sending node to direct the specific data packet to a first router and upon occurrence of a failure of the first router, to direct the specific data packet to a second router.

4. The method according to claim 1, wherein the routing query comprises an address field of the destination node, and wherein sending the routing instruction comprises selecting the specific router as a numerical function of the address field.

5. The method according to claim 1, wherein the routing query specifies a global identifier of the destination node, and wherein sending the routing instruction comprises instructing the sending node to address the specific data packet to a local identifier that the subnet manager has assigned to a port of the specific router.

6. The method according to claim 5, and comprising transmitting, from the sending node to a distributed name server, a name query with respect to a host name of the destination node, and receiving the global identifier at the sending node from the distributed name server in response to the name query.

7. The method according to claim 1, and further comprising configuring the routers to form a multicast group extending over at least the first and second subnets via one or more of the routers.

8. The method according to claim 1, wherein providing the forwarding instruction comprises providing the forwarding instruction by the second subnet manager in response to a query from the specific router generated responsively to receiving the specific data packet.

9. The method according to claim 1, wherein providing the forwarding instruction comprises providing the forwarding instruction by the first subnet manager in response to the routing query.

10. The method according to claim 1, and further comprising caching the forwarding instruction at the sending node for use in forwarding subsequent data packets to a destination of the specific packet.

11. Apparatus for communication, comprising:
a plurality of routers interconnecting at least first and second subnets in a packet data network; and
at least first and second subnet managers, which are operative to assign respective local identifiers to ports for addressing of data link traffic within each subnet, such that the first subnet manager assigns the local identifiers in the first subnet, and the second subnet manager assigns the local identifiers in the second subnet, wherein the first subnet manager is configured to receive from a sending node in the first subnet, a routing query for a specific data packet directed to a destination node in the second subnet, and to send to the sending node, a routing instruction as to a specific router to which the specific data packet is to be transmitted, responsive to the routing query, and wherein one of the at least first and second subnet managers is configured to provide to the specific router a forwarding instruction for the specific data packet, responsively to the routing query.

12. The apparatus according to claim 11, wherein the first subnet manager is configured to select the specific router so as to balance a traffic load among the plurality of the routers.

13. The apparatus according to claim 11, wherein the first subnet manager is configured to instruct the sending node to direct the specific data packet to a first router and upon occurrence of a failure of the first router, to direct the specific data packet to a second router.

14. The apparatus according to claim 11, wherein the routing query comprises an address field of the destination node, and wherein the first subnet manager is configured to select the specific router as a numerical function of the address field.

15. The apparatus according to claim 11, wherein the routing query specifies a global identifier of the destination node, and wherein the routing instruction to the sending node specifies a local identifier that the subnet manager has assigned to a port of the specific router.

16. The apparatus according to claim 15, and comprising a distributed name server, which is configured to receive from the sending node a name query with respect to a host name of the destination node, and to provide the global identifier of the destination node to the sending node in response to the name query.

17. The apparatus according to claim 11, wherein the subnet managers are operative to configure the routers to form a multicast group extending over at least the first and second subnets via one or more of the routers.

18. The apparatus according to claim 11, wherein the second subnet manager is configured to provide the forwarding instruction to the specific router in response to a query from the specific router generated responsively to receiving the specific data packet.

19. The apparatus according to claim 11, wherein the first subnet manager is configured to provide the forwarding instruction to the specific router in response to the routing query.

20. The apparatus according to claim 11, wherein the sending node is configured to cache the forwarding instruction at the sending node for use in forwarding subsequent data packets to a destination of the specific packet.

21. The apparatus according to claim 11, wherein the multiple routers are configured to operate such that they do not exchange routing information.

22. A computer software product, comprising a non-transitory computer-readable medium in which program instructions are stored, which instructions, when read by a computer in a first subnet of a packet data network that includes a plurality of routers interconnecting multiple subnets, cause the computer to function as a first subnet manager in the first subnet so as to assign respective local identifiers to ports for addressing of data link traffic within the first subnet, while at least a second subnet manager assigns the local identifiers to the ports in at least a second subnet, wherein the program instructions cause the first subnet manager to be configured to receive from a sending node in the first subnet, a routing query for a specific data packet directed to a destination node in the second subnet, and to send to the sending node, a routing instruction as to a specific router to which the specific data packet is to be transmitted, responsive to the routing query, and cause one of the at least first and second subnet managers to be configured to provide to the specific router a forwarding instruction for the specific data packet, responsively to the routing query.

* * * * *